Aug. 3, 1965 N. L. STONE ETAL 3,199,025

APPARATUS INCLUDING SWITCHING MEANS FOR SELECTIVELY VARYING THE OPERATING PARAMETERS OF A CIRCUIT UNDER TEST

Filed Aug. 1, 1960 4 Sheets-Sheet 1

INVENTORS
NORMAN L. STONE
JOHN D. CAVALLARI, JR.
BY
Pennie Edmonds Morton Barrows Taylor
ATTORNEYS APPARATUS INCLUDING SWITCHING MEANS FOR SELECTIVELY VARYING THE OPERATING PARAMETERS OF A CIRCUIT UNDER TEST Filed Aug. 1, 1960 4 Sheets-Sheet 2

INVENTORS
NORMAN L. STONE
JOHN D. CAVALLARI, JR.
BY
Pennie Edmonds Morton Barrows Taylor
ATTORNEYS APPARATUS INCLUDING SWITCHING MEANS FOR SELECTIVELY VARYING THE OPERATING PARAMETERS OF A CIRCUIT UNDER TEST Filed Aug. 1, 1960 4 Sheets-Sheet 3

INVENTORS
NORMAN L. STONE
JOHN D. CAVALLARI, JR.
BY
[signature]
ATTORNEYS

APPARATUS INCLUDING SWITCHING MEANS FOR SELECTIVELY VARYING THE OPERATING PARAMETERS OF A CIRCUIT UNDER TEST

Filed Aug. 1, 1960 4 Sheets-Sheet 4

INVENTORS
NORMAN L. STONE
JOHN D. CAVALLARI, JR.
BY
Pennie Edmonds Morton Barrows & Taylor
ATTORNEYS 3,199,025

APPARATUS INCLUDING SWITCHING MEANS FOR SELECTIVELY VARYING THE OPERATING PARAMETERS OF A CIRCUIT UNDER TEST

Norman L. Stone, Westbury, and John D. Cavallari, Jr., Rosedale, N.Y., assignors to Cutler-Hammer, Inc., Milwaukee, Wis., a corporation of Delaware Filed Aug. 1, 1960, Ser. No. 46,429
3 Claims. (Cl. 324—73)

This invention relates to an automatic circuit tolerance tester.

In electronic circuits reliability is very important. In some applications satisfactory operation for long periods of time is desired so as to reduce lost operating time and maintenance costs. In others, particularly in military applications, a failure may have disastrous consequences. In still others, such as in space applications, the difficulty or impossibility of correcting a failure makes reliability essential.

Although designing for reliability is not new, the increasing complexity of electronic circuits, the increasing reliance placed upon them, and in many instances the increasing range of environmental conditions under which they are required to operate, have enormously increased the problems of the designer.

Failure of an electronic equipment may be divided broadly into two categories. The first is the failure of an individual component, or of several components, due to a radical change in component characteristics. Examples are a burned-out tube or resistor, a short-circuited or open-circuited capacitor or other component, etc. These are often called catastrophic failures.

By careful selection of high quality components, light loading thereof, care in assembly and wiring, etc., such catastrophic failures can be greatly reduced. Also, designing apparatus to perform the required function with a minimum of components, and with types of components known to be reliable, is of great value.

The second category is a failure resulting from a steady degradation in component characteristics due to aging, environment, etc., or a change in characteristics as the operating environment (temperature, pressure, humidity, etc.) changes. Although a change in a single component due to such factors may be responsible for an overall failure of the equipment, more often the overall failure is due to the interaction of changes in a number of components. Also, the overall failure may not be a complete breakdown, but rather the inability of the equipment to perform its function satisfactorily.

The present invention is particularly directed to decreasing the probability of failures in this second category.

Normally certain tolerances are specified for components as initially installed. If the circuit is properly designed, it should perform to overall specifications for any combination of components within the specified tolerances. However, due to aging or change in operating environment, one or more components may go outside of the initial specified tolerances.

Overall reliability is promoted by designing the circuit so that it is tolerant of variations in component characteristics. The extent to which this can be done depends on the particular application and the skill of the designer. When carried out to the best of the designer's ability, and when other factors including those mentioned above have been taken into account, it is highly desirable to test the design to ascertain whether it meets expectations.

With adequate test data it is possible to determine with reasonable accuracy the maximum variations of a given component over a given period of time and under the operating conditions to be encountered. Thus the expected maximum and minimum values of each component, taking into account the initial specified tolerance thereof, can be determined.

There then remains the problem of determining whether the circuit as a whole will operate within specifications for each and every combination of maximum and minimum values of the individual components.

The number of combinations to be tested increases rapidly with the number of components in the circuit, in accordance with the formula $2^n$ where $n$ is the number of components. Eight components gives 256 combinations, twelve components gives 4,096 combinations, and sixteen components gives 65,536 combinations. It is apparent that even for relatively simple circuits the number of combinations to be tested renders impractical the substitution of components by conventional soldering-unsoldering and plug-in techniques.

It is not always necessary to test each and every combination of component values in order to assure a satisfactory degree of reliability. By applying the principles of probability, it is possible to determine how many components ($m$) of a total number ($n$) must be tested in their various combinations in order to be reasonably assured of a given degree of reliability. In general this procedure presupposes that the $m$ components selected for the test are those which would cause the greatest change in circuit performance, that is, that they are the most sensitive components.

For example, if a circuit contains 30 components, it may suffice to test the various combinations of only 10 components to obtain a reliability of 0.99; 13 components for a reliability of 0.999; and 15 components for a reliability of 0.9999. Even with this reduction, the total number of combinations to be tested may be quite formidable.

In accordance with the present invention, apparatus is provided for automatically and rapidly changing the values of selected circuit components between upper and lower limits in a sequence such that all combinations of the components have been tested at the conclusion of the operation. To this end, switching devices such as relays are arranged to switch corresponding circuit components to their upper and lower limits. The switching devices are actuated, advantageously by a binary counter, so that different combinations are created successively until all combinations have been obtained. The circuit under test is supplied with an appropriate signal input, and the output monitored to determine whether the circuit is operating within specifications for each combination.

Advantageously the monitoring device is arranged to give a failure signal when a particular combination results in operation outside of specifications, and the signal is employed to stop the switching so that the combination can be recorded. Operation can then be resumed until another faulty combination is reached or the test terminated.

To permit the convenient use of the equipment for many different circuit configurations, in the specific embodiment described hereinafter a plug board is provided in which the relay switches are wired between certain jacks, and additional jacks are provided so that circuit components can readily be plugged in. Advantageously the jacks are arranged in sub-groups, each sub-group having a relay switch wired between two jacks, with additional permanent connections between selected jacks so that a particular circuit to be tested can rapidly be set up. In general two individual elements are plugged into a given sub-group for a single circuit component, and the values of the individual elements selected so that the operation of the associated relay switch gives the desired upper and lower limits of that particular component. The sub-groups are then interconnected to give the desired overall circuit to be tested.

The specific embodiment of the invention described hereinafter contains additional features which will in part be pointed out, and in part be apparent to those skilled in the art.

Figure 1:
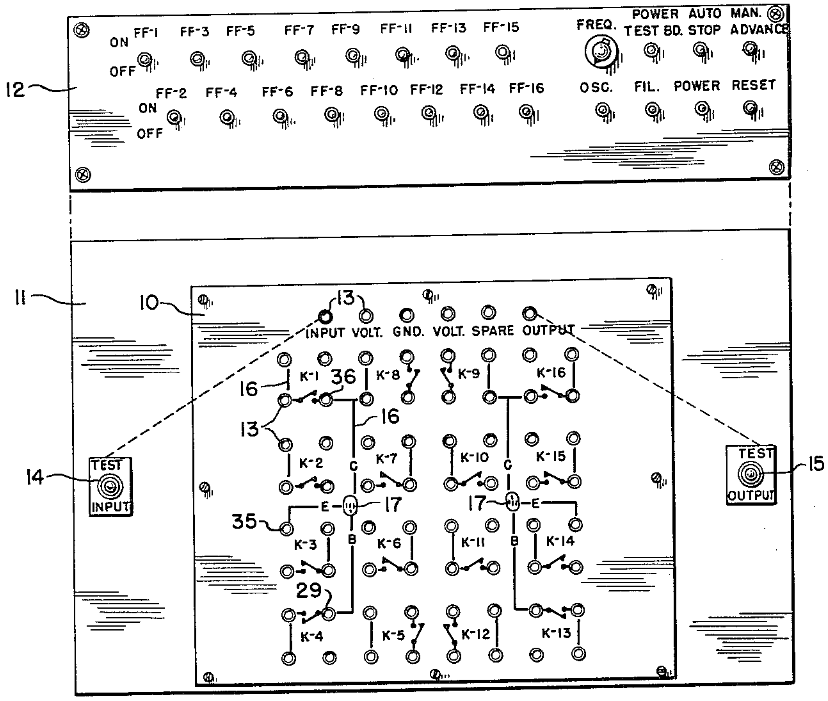
FIG. 1 shows a control panel and plug board for setting up a circuit to be tested.

Referring now to FIG. 1, a plug board 10 is shown mounted on a panel 11 which may form the top of a console unit containing the electronic circuitry to be described hereinafter. A control panel 12 has switches, etc. mounted thereon to facilitate operation. Conveniently panel 12 is vertically mounted at the back of console top 11, but it is here shown in the same plane for ease of illustration.

Plug board 10 is provided with a number of jacks 13 to enable circuit elements to be plugged therein, and also to permit convenient interconnection of circuit elements, etc. by means of plug cables. At the top of the panel board are six jacks labeled as shown. The input jack is wired beneath panel 11 to a connector 14 to which an input appropriate to the circuit to be tested may be applied. The output jack is similarly wired to an output connector 15, so that the output can be delivered to a suitable monitor or other means for determining correct and incorrect operation. Two jacks are provided for supplying desired voltages to the circuit under test. Another jack is provided to serve as a ground connection, and a jack labeled "Spare" is provided for use as necessary.

The remaining jacks are arranged in sub-groups of four, with designations K1 . . . K16 in the center of respective sub-groups. Each sub-group has a relay switch connected between two jacks thereof, as shown by a switch symbol. The solid lines 16 are engraved or otherwise formed on the surface of 10 and indicate that the associated jacks are wired together beneath the panel. Certain sub-groups have one of the switch plugs connected to third plug, as in the case of K1. Other sub-groups have the third and fourth plugs interconnected, as in the case of K5. This promotes flexibility in setting up different types of circuits.

The plug board illustrated is particularly intended for the setting up of circuits containing transistors and semiconductor diodes, together with resistors and capacitors (and inductors when required). All of these types of components could be arranged for switching. However, the switching of transistors would commonly require that the circuit be opened during the switching, thus having the effect of a failure which might cause false actuation of the output monitor. Hence, in the illustrated arrangement it is not contemplated that transistors will be switched. However, two receptacles 17 are provided so that transistors can be connected in circuit. By repeating a given test with different transistors, the effect of variations in transistor characteristics can be determined. The sockets 17 have permanent connections to certain plugs, as shown in full lines, to facilitate setting up of circuits.

Control panel 12 contains sixteen toggle switches labeled FF1 to FF16 having ON–OFF positions. In the ON position the respective relay and associated control circuit is in operation, and in the OFF position the stage containing that relay is bypassed. This will be described in connection with FIG. 5. Additional controls at the right of the control panel have their functions labeled. The use thereof will be apparent from the description of subsequent figures.

The manner in which the plug board 10 is used to set up a circuit will be further explained in connection with a specific example. Suppose that it is desired to test the circuit of FIG. 2(*a*) with each component at upper and lower limits, and in all combinations. This circuit is far simpler than would ordinarily be tested with the apparatus of the invention, but suffices for purposes of illustration.

Transistor 21 is connected as an emitter-follower, with an emitter resistor 22 connected to a minus voltage supply denoted −B. The collector is connected to a +B voltage supply. Resistor 23 is connected from the base to −B. The input signal is supplied through a capacitor 24 to the base of the transistor, and a semiconductor diode 25 is connected from the base to ground. The overall operation of the circuit is to restore the D.-C. component of the input signal and supply the signal to the output at a low impedance level.

Upper and lower test limits for capacitor 24, resistors 23 and 22, and diode 25 will be determined. Although it is possible to employ two elements of upper and lower values for each component in FIG. 2(*a*), and switch from one to the other, this would usually require opening the circuit momentarily during switching which might be indicated as a failure. Accordingly, it is preferred to employ one element at one limit value, and another corresponding to the limit range (high limit minus low limit), and switch the range element into and out of circuit in such a manner that the first element always remains in circuit.

Figure 2:
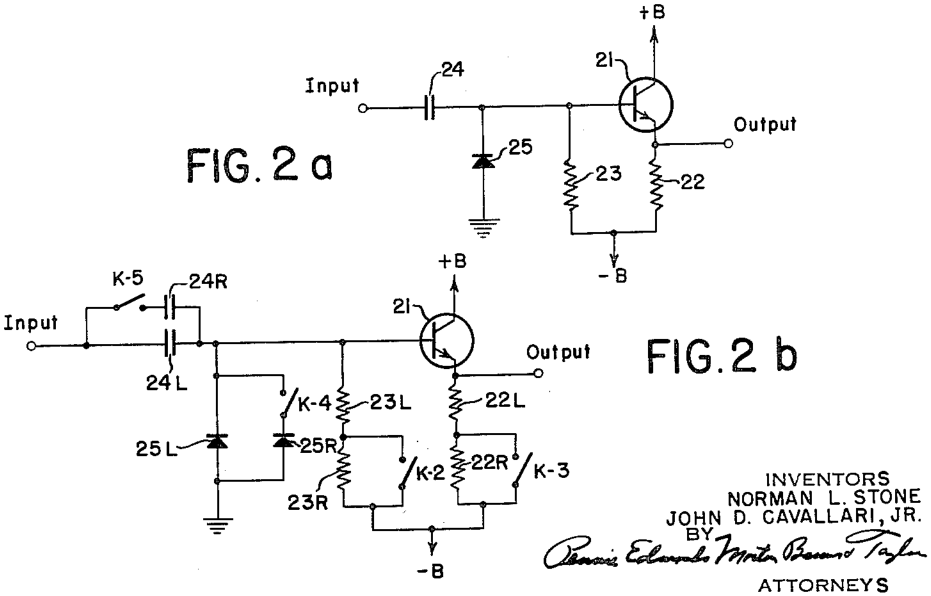
FIG. 2(*a*) illustrates a simple circuit to be tested and FIG. 2(*b*) shows the actual circuit elements to be employed.

FIG. 2(*b*) illustrates one way of interconnecting elements for testing the circuit of FIG. 2(*a*). Capacitor 25L has the lower limit value of capacitor 24. Capacitor 24R is the range capacitor and has a value selected so that, when it is placed in parallel with 24L by the closing of relay switch K5, the resultant value will be the upper limit for capacitor 24. It will be observed that when switch K5 opens, capacitor 24L remains in circuit so as to minimize switching transients. Diode 25L has a conductance selected to be the minimum conductance for diode 25. Diode 25R is the range diode and its value is selected so that when it is placed in parallel by the closing of K4, the total conductance will be the upper limit.

Resistor 23L is selected at the lower limit for resistor 23, and resistor 23R selected so that, when added to 23L, the upper limit of resistor 23 is obtained. Resistor 23R is short-circuited by the closing of K2 for the lower limit, and the short circuit removed for the upper limit. Resistor 22 is similarly replaced by the series resistors 22L and 22R, the latter arranged to be short-circuited by K3 for the lower limit.

Transistor 21 is not switched, for reasons given above. However, two transistors may be selected representing the two test limits. All combinations of the other elements may then be tested with each transistor.

Figure 3:
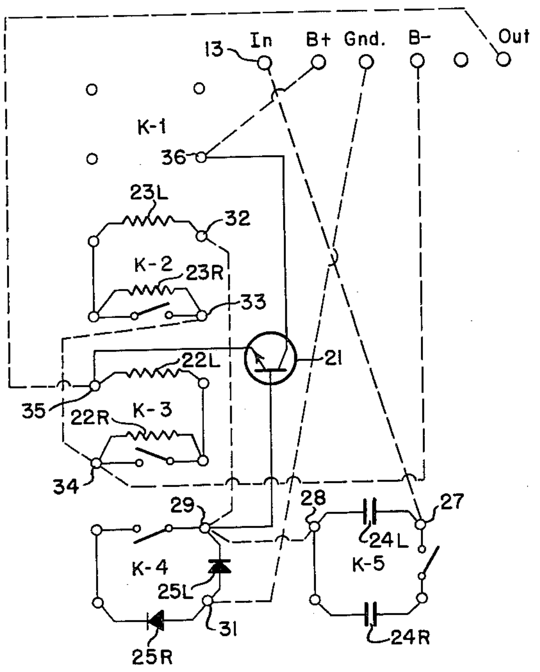
FIG. 3 shows the manner in which the elements of FIG. 2(*b*) may be set up on the plug board of FIG. 1.

Referring now to FIG. 3, the manner of setting up the circuit of FIG. 2(*b*) on the plug board of FIG. 1 is illustrated. Sub-groups K2–K5 are employed as the switching relays, and these are designated in FIG. 2(*b*). The input jack is connected by a plug cable shown by dash lines to jack 27, which is permanently wired to one terminal of the switch actuated by relay K5. Jack 28 is used as the output terminal of that sub-group and is connected by a plug cable to jack 29. The latter is permanently connected to one terminal of the K4 switch. Capacitors 24L and 24R are plugged into the jacks of sub-group K5 and diodes 25L and 25R are plugged into the K4 jacks as shown. Jack 31 is connected by a plug cable to the ground jack.

Jack 29 is also connected by a plug cable to jack 32 in the K2 sub-group. Resistors 23L and 23R are plugged into the jacks of this sub-group. Jack 33 is connected by a plug cable to jack 34 in the K3 sub-group. Resistors 22L and 22R are plugged into the latter sub-group.

As indicated in FIG. 1, jack 35 is permanently wired to the emitter terminal of the transistor socket, and jack 29 is permanently wired to the base terminal of the transistor socket. The collector terminal of the socket is permanently wired to jack 36 in the K1 sub-group. Accordingly, jack 36 is connected by a plug cable to one of the voltage jacks to which B+ is supplied. Jack 35 is connected by a plug cable to the output jack on the plug board.

Thus the circuit of FIG. 2(*b*) has been set up on the plug board, ready for test.

As is seen from FIG. 2(*b*), the two limits for resistors 22 and 23 are obtained by connecting two resistors in series representing the upper limit and shorting out one resistor for the lower limit. On the other hand, the two limits for the capacitor are obtained by adding capacitors in parallel for the upper limit and eliminating one for the lower limit. If desired, a parallel arrangement of resistors or a series arrangement of capacitors of appropriate values may be employed to obtain upper and lower limits. However, the arrangement shown is usually more convenient. Similarly, series arrangements of diodes rather than parallel arrangements could be employed if desired. In general, the manner of connecting elements to enable switching between two limits may be chosen to suit the requirements of the particular application.

Figure 4:
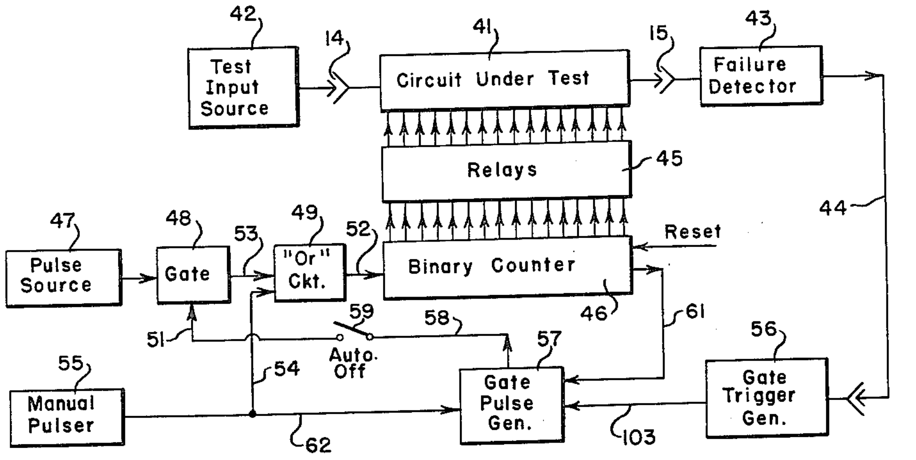
FIG. 4 is a block diagram of the overall arrangement of the apparatus of the invention.

Referring now to FIG. 4, the general circuit arrangement of the test apparatus of the invention is depicted. Block 41 designates the circuit under test, which is set up on the plug board in the specific embodiment described, as above explained. A suitable test signal input source is shown at 42. The test signal may be the type for which the circuit 41 is designed, or a different type which suffices to give an adequate test of the circuit.

The output of circuit 41 is supplied to a failure detector 43. Detector 43 may take various forms depending on the particular application, and in general is designed to yield an output in line 44 whenever circuit 41 is not performing to specifications.

The switches associated with circuit 41 are operated by corresponding relays in block 45, and the relays are operated by corresponding stages of a binary counter 46. For sixteen relays and associated switches, the binary counter may contain sixteen stages. Each stage provides two conditions of operation of the respective relay.

A sixteen-stage binary counter is capable of counting to 65,536, and when the count is finished all combinations of the two conditions of operation of each binary stage and corresponding relay have been obtained.

The binary counter 46 is actuated automatically from one count to the next by successive pulses from source 47. These pulses are supplied to the counter through a gate circuit 48 and an "OR" circuit 49. When gate 48 is closed, by a suitable signal through line 51, it cuts off the flow of pulses from source 47.

The "OR" circuit 49 is a type of circuit known in the computer field and is designed to deliver a pulse to its output line 52 whenever a pulse is present in either input line 53 or input line 54. In the case of simultaneous pulses in both input lines, only one pulse is delivered to the output line 52.

Provision is made for manually stepping the binary counter 46 from one count to the next by corresponding pulses from manual pulser 55. Exclusively manual pulsing can be employed by turning off pulse source 47.

Provision is made to stop the binary counter whenever a signal in line 44 indicates that the circuit 41 is not functioning properly. The signal in line 44 is delivered to gate trigger generator 56 and thence to a gate pulse generator 57 which supplies a signal through line 58 to close gate 48. Switch 59 may be opened to eliminate this stopping feature.

When the counter 46 has reached its maximum count, a signal is delivered through line 61 to gate pulse generator 57 to close gate 48 and stop further actuation of the counter. Thus, when the test has been completed the apparatus automatically stops.

When switch 59 is closed and a failure has stopped the count, the operator may record the particular combination resulting in the failure. This is conveniently accomplished by arranging for suitable lamps to be lighted for one of the two conditions of operation of each stage of the binary counter or of each relay. Then, manual pulser 55 may be actuated to step the counter to the next count.

The signal from the manual pulser 55 is also supplied to the gate pulse generator 57 through line 62 so as to terminate the gate pulse in line 58 and reopen gate 48. Thus, if the new combination in circuit 41 is functioning satisfactorily, operation will continue automatically until another failure occurs or the test is completed.

Figure 5:
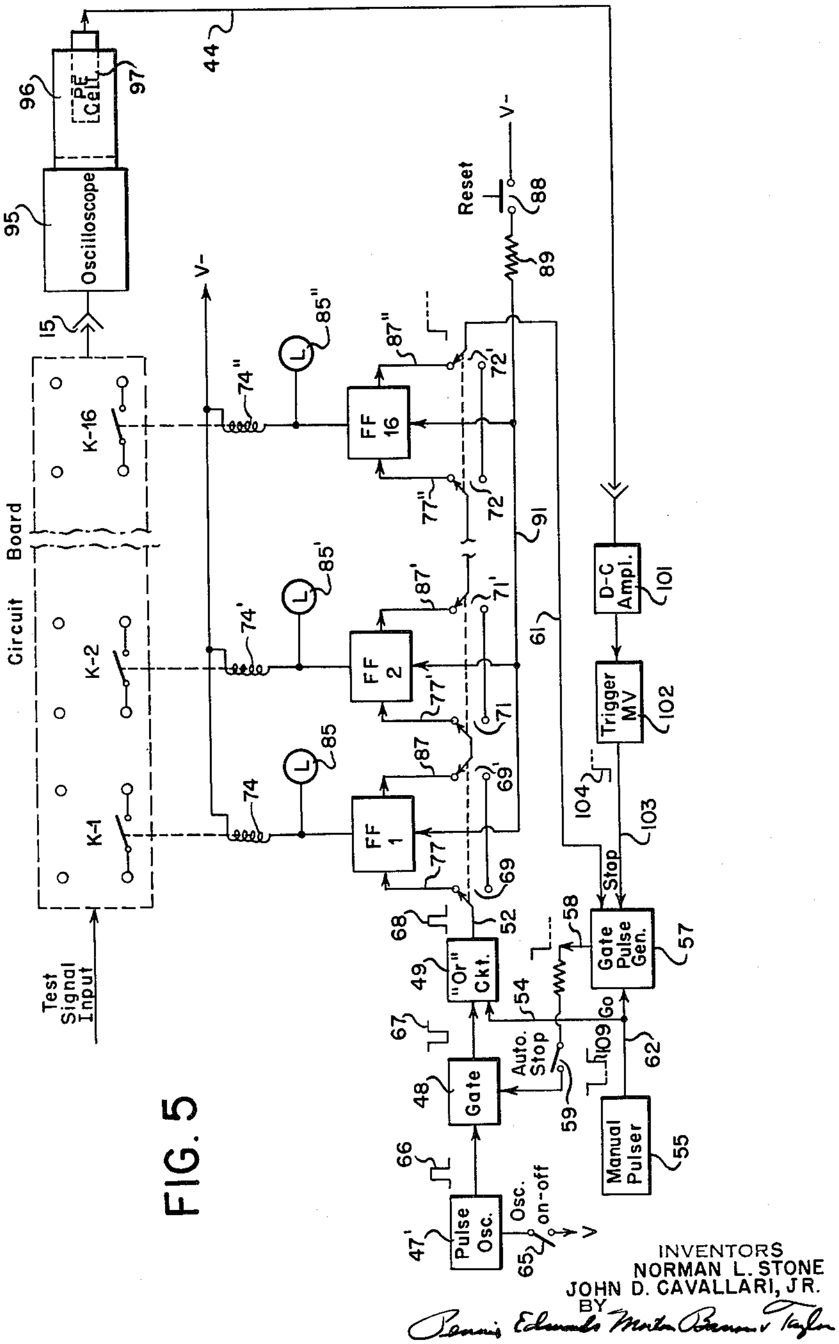
FIG. 5 is a block diagram illustrating certain features of FIG. 4 in more detail.

FIG. 5 shows the binary counter and relay arrangement in somewhat more detail, and also shows additional details. The pulse source is here shown as a pulse oscillator 47′ which can be turned on and off by the switch 65. Advantageously the oscillator is of adjustable frequency, and in a specific embodiment a variation from 5 to 100 pulses per second has been employed with success. The oscillator is assumed to supply output positive-going pulses as shown by waveform 66. Gate 48 is assumed to contain an amplifying tube or transistor which inverts the pulses passing therethrough and yields output pulses as shown by waveform 67. The "OR" circuit 49 is assumed to invert pulses passing therethrough, thus yielding positive-going output pulses as shown by waveform 68.

Ganged switches 69, 69′, 71, 71′ . . . and 72, 72′ are provided so that any stage or stages of the binary counter may be bypassed. These are the toggle switches labeled FF1 . . . FF16 on the control panel 12 of FIG. 1.

The counter is assumed to have sixteen stages, but only the first two and last stages FF1, FF2 and FF16 are shown. The break in the connection between FF2 and FF16 indicates where the remaining stages are inserted. In the positions of the switches shown, all three stages are in operation. By switching 69, 69′ to its other position, stage FF1 may be bypassed, and pulses 68 delivered directly to the input of the second stage FF2.

The binary stages may take any convenient form. In the specific embodiment here shown, they are transistor multivibrator or "flip-flop" circuits, as shown in FIG. 6.

Figures 6, 7, 8, 9:
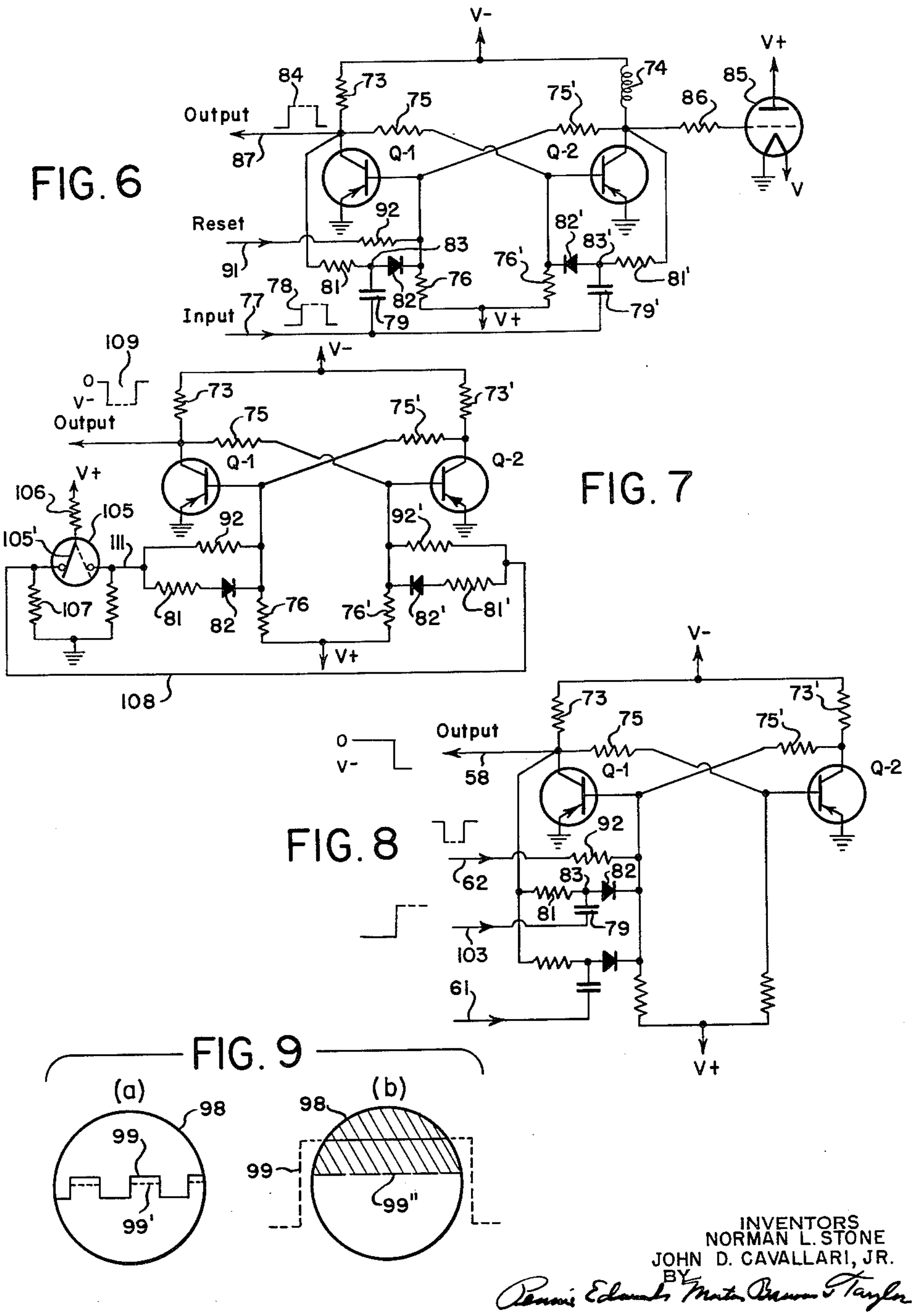
FIGS. 6–8 illustrate suitable circuits for the arrangement of FIG. 5.
FIG. 9 illustrates one form of failure detector.

Referring to FIG. 6, two transistors Q1 and Q2 of the PNP type have their emitters grounded and collectors connected to a negative power supply or battery denoted V−. The collector load of Q1 is a resistor 73 and the collector load of Q2 is the actuating coil 74 of the relay operated by the multivibrator. The collectors and bases are cross-connected by resistors 75, 75′ which may be of equal value. The bases are connected to a positive voltage denoted V+ through resistors 76, 76′. Resistors 76, 76′ are advantageously considerably larger than resistors 75, 75′. In a particular embodiment resistor 75, 75′ were 3.9K, resistors 76, 76′ were 180K and the voltages were −12 volts and +50 volts, respectively.

This multivibrator is of the bistable type. That is, it has two states of equilibrium and will remain in a given state until a signal is received which changes it to the opposite state. If at a given moment Q1 is conducting, its collector will be at nearly ground potential. The V+ will be divided between resistors 76′ and 75, thus applying a voltage to the base of Q2 which is slightly positive to ground. This cuts off Q2. The collector of Q2 will then be at V—, and the division of voltage between V— and V+ produced by resistors 75' and 76 yields a negative voltage at the base of Q1 which causes Q1 to conduct to saturation. If Q2 is conducting at a given moment, the reverse action takes place, causing Q1 to be cut off and Q2 to be driven to saturation.

Positive-going switching pulses in input line 77 are employed for switching purposes. The waveform of the pulses is shown at 78 and may be pulses from the "OR" circuit 49 or from a previous multivibrator stage, as the case may be. The duration of pulse 78 depends on whether it comes initially from the pulse oscillator 47', the manual pulser 55, or from a previous "flip-flop," and hence the top is shown dotted.

Pulses 78 are supplied through capacitors 79, 79' to the junction of resistors 81, 81' and diodes 82, 82', respectively. Resistors 81, 81' are connected to the collectors of Q1 and Q2, respectively, and the diodes are connected to the respective bases. Capacitors 79, 79' and respective resistors 81, 81' form differentiating circuits to yield positive and negative spikes at the leading and trailing edges of the applied pulses 78. The amplitude of pulses 78 is selected so that the positive spike amplitude is somewhat less than the magnitude of V—.

If Q1 is non-conducting, its collector will be at V— and the differentiated voltage at point 83 will be added to the V— applied to resistor 81. The resulting voltage never goes positive and is blocked by diode 82. However, since Q2 will be conducting, its collector will be near ground potential and the positive-going spike at point 83' will go positive, hence passing through diode 82' to the base of Q2. This will cut off Q2 and thereby cause Q1 to conduct. This initiates an output pulse 84 in output line 87 of Q1. The differentiated negative spike from the trailing edge of pulses 78 will be blocked by diodes 82 and 82' and will be ineffective.

Q1 will remain conducting until the arrival of the next pulse in line 77, whereupon it will be cut off by the differentiated spike from the leading edge thereof. This terminates output pulse 84 and causes Q2 to conduct.

Thus, one input pulse 78 will cause transistors Q1 and Q2 to change from one state of equilibrium to the other, and the next pulse will reverse the operation. One output pulse 84 will be produced for each two input pulses 78.

When Q2 is conducting, current will flow through relay actuating coil 74 to close the associated switch. When Q2 is non-conducting, the coil is deenergized and the switch opens. Tube 85 is an indicating tube which glows when current passes therethrough. When Q2 is non-conducting, its collector is at V— and the potential supplied to the grid of tube 85 through the resistor 86 cuts off the indicating tube so that it is dark. When Q2 conducts, the grid potential of tube 85 is near ground and the tube glows.

Thus tube 85 glows when the actuating coil 74 of the relay is energized, corresponding to the closed position of the associated switch. In the test circuit shown in FIGS. 2(*b*) and 3, it will be seen that the indicating tubes 85 in respective stages glow when the resistors are at their low limit value, when the capacitors are at their high limit value, and when the diodes are at their low value of forward resistance. Thus, the light and dark conditions of the lamps associated with different stages serve to indicate upper and lower limits of respective components.

Returning to FIG. 5, the input line 77 of the first counter stage FF1 is supplied with pulses 68 through switch 69 and the output in line 87 is supplied to the input of the next stage FF2. This continues until the final stage FF16 is reached and the output of that stage in line 87'' is fed to line 61 to stop operation. Relay coils 74, 74' operate respective switches K1, K2, etc.

When the apparatus is initially turned on, the multivibrators FF1 . . . FF16 will have random stages of equilibrium which require resetting to given states corresponding to zero before counting can proceed. Also, after a test is completed the counter should be reset to zero for the next test. This is accomplished by closing reset switch 88 which applies a negative voltage from V— through resistor 89 and line 91 to the several multivibrators FF1 . . . FF16.

The resetting operation may be understood by reference back to FIG. 6. A negative voltage in reset line 91 is applied through resistor 92 to the base of transistor Q1. If the transistor is already conducting, this negative voltage will have no effect. However, if Q1 is not conducting, its base will be somewhat positive to ground and the application of the negative voltage to line 91 will overcome the slight positive bias and render Q1 conducting. The reset voltage and the values of resistors 89 and 92 may be selected to yield the desired result. In a particular application, the negative reset voltage was equal to that applied to the collectors of the transistors in FIG. 6, resistor 89 was of small value, and resistor 92 equal to resistors 75, 75'.

Returning to FIG. 5, the output of the circuit under test is shown supplied to an oscilloscope 95 having a hood 96 containing one or more photoelectric cells 97. The face of the oscilloscope is masked so that normal output signals are obscured by the mask and do not actuate the photocells. However, when the output signal is outside of specifications, it falls outside of the masked area and light reaches the photoelectric cell or cells to yield a corresponding signal in line 44.

The manner in which the mask is used is illustrated in FIG. 9. Here it is assumed that the circuit under test is an amplifier intended to amplify a square wave. The face of the oscilloscope 95 is shown at 98 and a normal square wave at 99. Dotted line 99' indicates the lower limit of the amplified wave according to specifications.

FIG. 9(*b*) shows the square wave expanded in horizontal and vertical directions. Dash line 99'' corresponds to the limit value 99' in FIG. 9(*a*). The upper portion of the tube face is masked by opaque tape so that whenever the reproduced signal lies above 99'', no light will reach the photoelectric cell 97 in the hood. However, if the amplification in the circuit under test is insufficient, the oscilloscope trace will fall below 99'' and the photoelectric cell will yield an output in line 44.

When the output must lie between two limits, a suitably positioned opaque band may be adhered to the face of the oscilloscope.

Returning to FIG. 5, the signal in line 44 is supplied through a connector to a D.-C. amplifier 101. The output of the amplifier actuates a trigger multivibrator 102. Unit 102 is designed to give an output signal in line 103 whenever the signal in line 44 exceeds a given value which corresponds to false operation of the circuit under test. In a specific embodiment a mulitivibrator of the Schmitt type is employed. This gives a positive-going pulse, as shown by waveform 104, which persists as long as a failure signal is present in line 44.

As previously explained, signals in lines 61 or 103 applied to gate pulse generator 57 cause the generation of a gate pulse which stops operation. Before describing this operation in detail, the manual pulser 55 will be further described.

Referring to FIG. 7, a suitable circuit for the manual pulser is illustrated. A bistable multivibrator of the same configuration as shown in FIG. 6 is employed. The collector load of Q2 is a resistor 73' in lieu of the relay coil 74. The manner in which the transistors are switched from one state of equilibrium to the other is somewhat different.

A manually-operated switch 105 has its switch arm 105' connected through resistor 106 to a positive source denoted V+. The switch arm 105' is normally spring-biased to the position shown so that resistor 106 is connected in series with resistor 107 to ground. Hence a positive voltage is supplied through line 108 to the base circuit of Q2.

As actually built, the present embodiment employed uniform plugin multivibrator units having a number of switching inputs connected in various manners to form the circuits of FIGS. 6–8. The switching resistors 92, 92′ and the series arrangement of resistors and diodes 81, 82 and 81′, 82′ were available so that it was convenient to connect them in parallel as shown in FIG. 7. In many cases one or the other of the paralleled circuits will suffice.

With the switch arm 105′ in the position shown, the positive potential through line 108 and elements 81′, 82′ and 92′ produces a positive potential at the base of Q2, cutting it off. Hence Q1 is normally on and the voltage in the output line 62 is at substantially ground potential as shown by the output waveform 109. When the switch arm 105′ is manually moved to its dotted position, the positive potential is supplied through line 111 and elements 81, 82, 92 to the base of Q1, thereby cutting off Q1 and turning on Q2. Thus the voltage in output line 62 goes negative, as indicated by waveform 109. When the switch arm 105′ returns to its full line position, output pulse 109 is terminated.

From FIG. 5 it will be seen that waveform 109 is supplied to the "OR" circuit 49 to step the counter to the next count, and also to the gate pulse generator 57.

Referring now to FIG. 8, a circuit suitable for the gate pulse generator 57 is shown. It is similar to that of FIG. 7, except for the triggering circuits. The conductive condition of Q1 corresponds to an open condition of gate 48. The output from the collector of Q1 in line 58 will be at substantially ground potential. A nonconductive condition of Q1 results in a negative voltage being supplied to line 58, which closes gate 48.

The output of the manual pulser is supplied to the gate pulse generator to permit opening gate 48 by a manual pulse when required. Thus manual pulses are supplied through line 62 and resistor 92 to the base of Q1. If Q1 is off (gate 48 closed), a negative manual pulse in line 62 will drive the base of Q1 negative, thereby causing Q1 to conduct and open gate 48. Thereafter the gate will remain open until a failure pulse arrives through line 103 or a stop pulse arrives from the last stage of the counter through line 61.

The trigger circuit 79, 81, 82 for the failure pulse in line 103 is the same as that in FIG. 6. The failure pulse is in the positive-going direction and is differentiated to produce a positive spike at point 83. If Q1 is on (gate open), the positive spike will pass through diode 82 to the base of Q1 to turn it off, thereby closing the gate.

The output pulse from the last stage of the counter is applied through line 61 to a triggering circuit similar to that described for the failure pulse, and operates in the same manner.

The overall operation may be summarized briefly. The circuit to be tested is assembled on the plug board as described in connection with FIGS. 1–3. The binary stages corresponding to any unused relay switches (K1 . . . K16) are bypassed by the action of the toggle switches on the control panel 12 of FIG. 1, shown at 69, 69′, etc. in FIG. 5. This avoids unnecessarily increasing the time required for testing.

A signal is applied to the circuit from a suitable source and a monitor such as the oscilloscope 95 arranged to provide a failure signal. For automatic stop, switch 59 is closed. The pulse repetition frequency of oscillator 47′ is adjusted to give the desired pulse rate and switches 65 closed to turn the oscillator on. Automatic reset switch 88 is closed to reset the counter to zero and then reopened. Depending on the initial condition of the gate pulse generator 57, automatic stepping through the various combinations may or may not take place. If not, the manual pulser may be actuated once to open the gate and allow operation to proceed.

If a failure occurs, operation will stop and the particular combination resulting in the failure may be noted. Then the manual pulser may be actuated once to resume automatic operation. When all combinations have been tested, an output in line 61 will close the gate and stop operation.

If exclusively manual pulsing is desired, switch 65 may be opened.

The indicating glow tubes 85 in FIG. 5 may be arranged as desired for convenient observation. In a specific embodiment each tube was incorporated in the corresponding multivibrator unit, such as shown in FIG. 6, and the units arranged for convenient observation. In this case a glow tube was also contained in the gate pulse generator unit, and served to indicate whether gate 48 was open or closed.

In the arrangement of FIG. 5 the output of the circuit under test is continuously monitored and a failure signal automatically developed when the circuit is not performing to specifications. In place of this automatic system, an oscilloscope or other type of output indicator may be employed which can be monitored by an operator to determine when a failure occurs. In such case a key may be arranged to supply an error signal in line 44, manually operated when a failure is observed. Slow pulse rates from oscillator 47′ or manual pulsing may be employed to facilitate visual monitoring.

If desired, separate boards may be employed for setting up circuits to be tested and arranged for convenient connection to the test apparatus, as by plugging in.

Although the test apparatus has particular usefulness in testing for circuit reliability, for which the selection of upper and lower limits of the components will take into account aging, environmental conditions, etc., it may also be found useful in other applications, for example, in circuit design to assure that proper tolerances have been specified, etc.

The invention has been described in connection with a specific embodiment thereof. It will be understood that many modifications may be made within the spirit and scope of the invention, and features added or omitted as meets the requirements of the intended application.

We claim:

1. A circuit tolerance tester for an electronic circuit having an input and an output and a plurality of circuit components operatively connected therebetween, which comprises a plurality of relay switches for switching corresponding components of said electronic circuit between predetermined upper and lower operating parameters of the components respectively, means for applying a test input signal to said circuit, a failure indicator, means for supplying the output of said circuit to said failure indicator, a binary counter having a plurality of binary stages, said relay switches being connected to be actuated by said binary stages respectively whereby successive actuations of the counter produce successive different combinations of positions of said switches, a source of repetitive pulses, a gate circuit, means for supplying said pulses through said gate circuit to said counter to produce successive actuations thereof, means responsive to said failure indicator for closing said gate when the output of said electronic circuit falls outside a predetermined range, and manually-operable means for opening said gate.

2. A circuit tolerance tester for an electronic circuit having an input and an output and a plurality of circuit components operatively connected therebetween, which comprises a plurality of relay switches for switching corresponding components of said electronic circuit between predetermined upper and lower operating parameters of the components respectively, means for applying a test input signal to said circuit, a failure indicator, means for supplying the output of said circuit to said failure indicator, a binary counter having a plurality of binary stages, said relay switches being connected to be actuated by said binary stages respectively whereby successive actuations of the counter produce successive different combinations of positions of said switches, a source of repetitive pulses, a gate circuit, means for supplying said pulses through said gate circuit to said counter to produce successive actuations thereof, means responsive to said failure indicator for closing said gate when the output of said electronic circuit falls outside a predetermined range, a manually-operable pulse source, means for supplying pulses from said manually-operable source to said counter to produce corresponding actuations thereof, and means for utilizing the last-mentioned pulses to open said gate.

3. A circuit tolerance tester for an electronic circuit having an input and an output and a plurality of circuit components operatively connected therebetween, which comprises a plurality of relay switches for switching corresponding components of said electronic circuit between predetermined upper and lower operating parameters of the components respectively, means for applying a test input signal to said circuit, a failure indicator, means for supplying the output of said circuit to said failure indicator, a binary counter having a plurality of binary stages connected in cascade, said relay switches being connected to be actuated by said binary stages respectively whereby successive actuations of the counter produce successive different combinations of positions of said switches, manually-operable means for individually bypassing selected stages of said counter, a source of repetitive pulses, a gate circuit, means for supplying said pulses through said gate circuit to said counter to produce successive actuations thereof, means responsive to said failure indicator for closing said gate when the output of said electronic circuit falls outside a predetermined range, means for utilizing the output of the last stage of said counter to close said gate, a manually-operable pulse source, means for supplying pulses from said manually-operable source to said counter to produce corresponding actuations thereof, and means for utilizing the last-mentioned pulses to open said gate.

References Cited by the Examiner

UNITED STATES PATENTS

| | | | |
|---|---|---|---|
| 2,328,750 | 9/43 | Smith et al. | 324—73 |
| 2,753,523 | 7/56 | Steigerwalt et al. | 324—73 |
| 2,776,405 | 1/57 | Moore et al. | 324—73 |
| 2,851,660 | 9/58 | Tobin et al. | 324—73 |
| 2,977,535 | 3/61 | O'Connor et al. | 324—73 |

OTHER REFERENCES

"A.C. Network Analyzer," article General Electric Review, September 1946, pp. 34–40.

"Automatic Functional Tester," article in Electronic Design, June 15, 1956, pp. 46 and 47.

"Go, No-Go Checks Out Bomarc Automatically," article in Electronics, Eng. Edition, July 4, 1958, pp. 43–45.

WALTER L. CARLSON, *Primary Examiner.*

SAMUEL BERNSTEIN, *Examiner.*